May 15, 1951 K. A. LEUSCHNER 2,552,985
APPARATUS FOR FILLETING FISH
Filed March 11, 1949 2 Sheets-Sheet 1
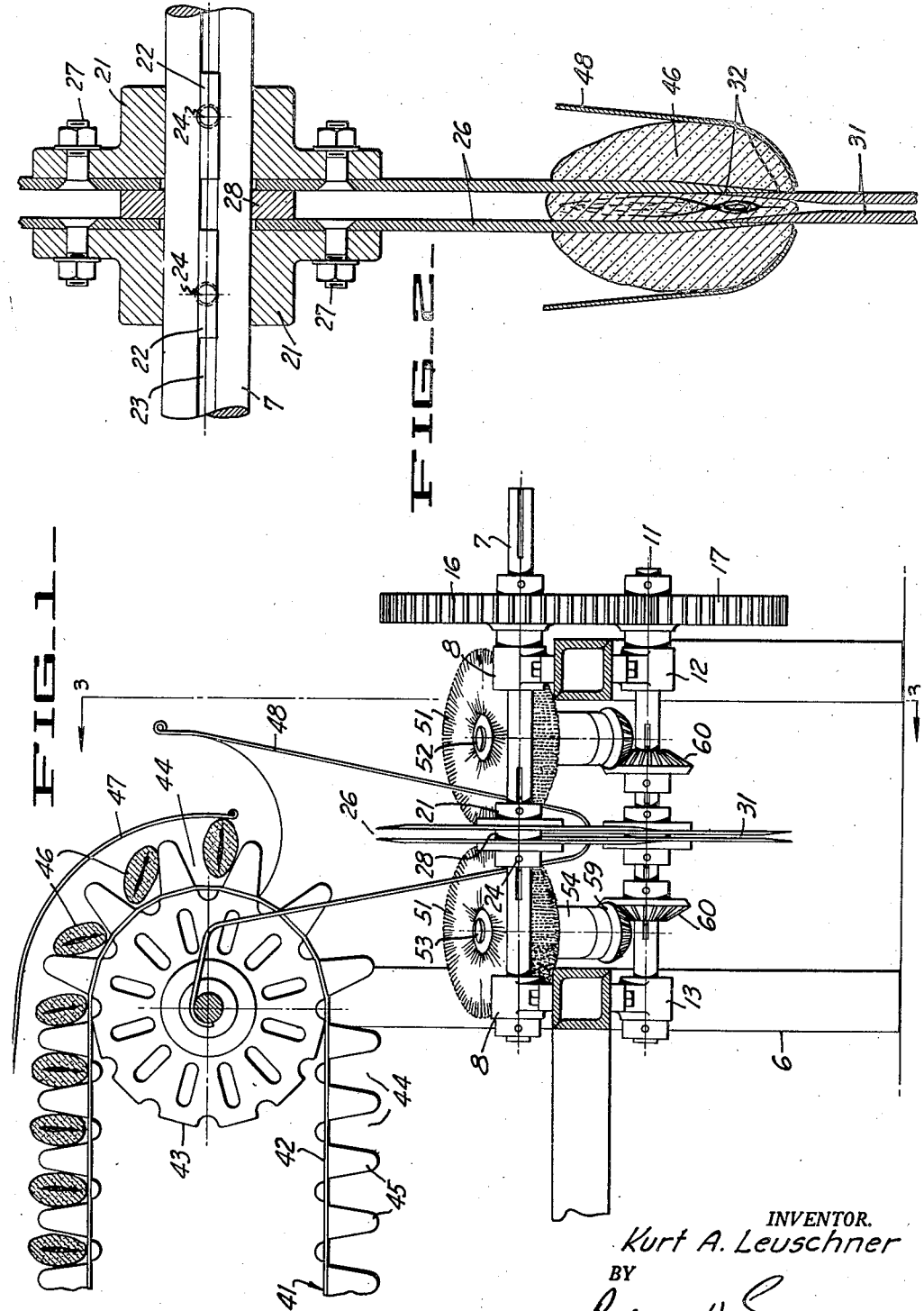
INVENTOR.
Kurt A. Leuschner
BY
Robert H. Seahoff
ATTORNEY

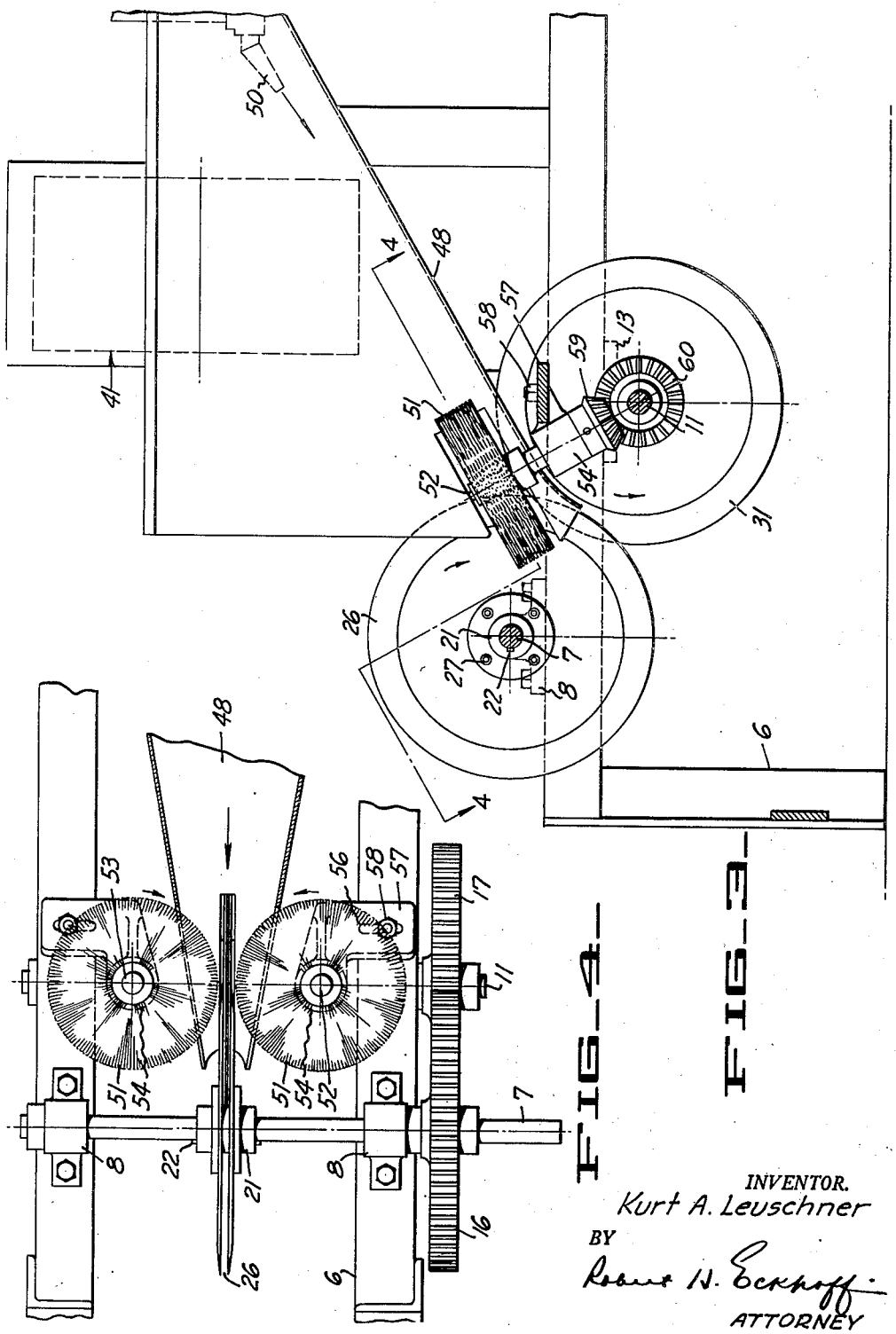

UNITED STATES PATENT OFFICE 2,552,985

APPARATUS FOR FILLETING FISH

Kurt Alfred Leuschner, Seaside, Calif., assignor to Harry A. Irving, Atherton, Calif.

Application March 11, 1949, Serial No. 80,840

6 Claims. (Cl. 17—4)

This invention relates to the preparation of fillets from fresh fish, and particularly to a machine for cutting fillets from fresh fish.

Generally, the invention relates to the method and to a machine of the type disclosed in the Hutton Patents 2,311,176 and 2,321,086; as is there disclosed, tailless and decapitated but otherwise whole fresh fish are cut by a pair of spaced rotary knives so as to cut a narrow V-cut in the fish, leaving the bone structure and entrails of the fish intact. While this method and machine have been successful, there are certain shortcomings, to wit: From a machine standpoint, the rotation of two circular knives at a small, acute angle to one another presents certain unique mechanical problems and in actual operation the maintenance of the machine is relatively expensive. Further, to ensure that the entrail portion of the fish is not cut, it is necessary to leave considerable meat on the sides of the fish. In accordance with the present invention, I propose to remove the head and tail portions of the fish and then to eviscerate the fish; these operations can be performed by hand or by machines, such as are shown in the Durand Patent 2,210,234, and in the McGrew Patent 2,192,838. Each tailless, decapitated and eviscerated fish is then moved longitudinally between two pairs of rotating circular knives, each knife pair rotating in opposite directions to the other pair but the knives in one pair overlap those in the other pair so that the cut made by the cooperating, overlapping knives is complete and the fillet is completely severed from the bone structure of the fish. Thus, I am able to space the knives in each pair only the width of the backbone so that a substantially increased yield of fillet is secured from a given weight of fish. In addition, the fish having been eviscerated, the fillets are free of any of the entrail portion of the fish.

In general, it is the broad object of the present invention to provide an improved machine for the cutting of fillets from fresh fish.

The additional object of the present invention is to provide a novel, simple and rugged machine for the preparation of fish fillets from fresh fish.

The invention includes other objects and features of advantage, some of which, together with the foregoing, will appear hereinafter wherein the present preferred practice of the invention is set forth. In the drawings accompanying and forming a part hereof, Figure 1 is a front view of a machine for practising the process or method of this invention.

Figure 2 is an enlarged sectional view showing the knife arrangement and the provision of these with respect to a fish undergoing cutting.

Figure 3 is a side elevation of the machine taken along line 3—3 of Figure 1.

Figure 4 is a plan view of a portion of the machine shown in Figure 1 taken along line 4—4 of Figure 3.

Referring to the drawings, a suitable frame structure, generally indicated at 6, is required. A first shaft 7 is mounted in bearings 8 upon opposite sides of the frame; a second shaft 11 is also mounted upon the frame and is supported for rotation in bearings 12 and 13. Shaft 7 carries a gear 16 in mesh with gear 17 on shaft 11 so that the two are driven in a timed relation and in opposite directions, shaft 7 being driven by a suitable prime mover, not shown.

Slidably mounted upon shaft 7 are a pair of hubs 21; each hub includes a key 22, slidable in a keyway 23, and having a set screw 24 therein to maintain the hub in the desired position of adjustment along the shaft. Each hub carries a circular knife blade 26, secured thereto by bolts 27. The hubs are spaced apart as by a suitable, removable spacer 28, the latter being of a width corresponding to that desired for the spacing between the knives, such spacing being dictated by the width of the backbone structure in the fish handled.

A similar adjustable knife structure is provided upon shaft 11, the second pair of knives being generally indicated by numeral 31. Referring particularly to Figure 2, it is to be noted that each of the knives 26 tapers from the outside face thereof to a knife edge 32, while each of the knives 31 tapers from the inside edge thereof to a knife edge 32 so that the overlapping portion of the two sets of circular knives are in face-to-face abutment and so that the cuts made in the fish overlap, but only to such an extent that the fillets are severed completely from the central portion of the fish; the cut face on each fillet is smooth and continuous and the overlap is not apparent.

Referring particularly to Figure 1, a suitable conveyor mechanism is generally indicated by numeral 41. This includes a flexible belt 42 trained about a sprocket 43, the belt 42 having a plurality of spaced carriers 45 thereon defining recesses 44 in which tailless, decapitated fish, generally indicated by numeral 46, are carried, a guard 47 retaining these in place as the conveyor moves about the sprocket 43, to release the tailless, decapitated and eviscerated fish to fall into a suitable trough 48 which slopes toward the knives. A stream of water is normally directed on the trough 48 so that the fish slide readily down the sloping trough and toward the circular knives.

To align the fish and to feed them into the circular knives, I preferably provide suitable feeding means; in the form illustrated in the drawing, such a feeding means comprises two flexible fiber brushes 51 each mounted upon shafts 52 and 53, the latter being carried in bushing 54 and being mounted upon and adjustable with respect to frame 6, as by slot 56 in bushing brackets 57 and bolts 58. Shafts 52 and 53 are driven by a pinion 59 meshed with another pinion 60 on shaft 11. In practice, I have found it advisable that the brushes rotate at a peripheral speed which is about twice that of the circular knives, so that the fish is fed in positively to the knives. However, once the fish is engaged with the knives, these exert a forward feeding action of their own upon the fish and it is only necessary to start a fish into engagement with the knives to have it pass through quickly, severing a fillet from each side and throwing these off to one side; that is, one fillet goes to the right-hand side of the machine, the other fillet goes to the left-hand side of the machine while the bone structure associated with the central portion of the fish moves forward to be collected and thrown away, or utilized for fertilizer.

It is to be noted that the brushes rotate in opposite directions to move a fish positively into the knives, the brushes rotating and engaging the fish in a plane which is substantially normal to a plane passed through shafts 7 and 11 and substantially parallel and coincident with a plane passed through the extreme boundaries of the area of overlap of the four knives. The fiber brushes act to close the fish belly, feed the fish and maintain it in alignment as it engages the knives.

Referring particularly to Figure 2, it is to be noted that trough 48 is so fashioned that in cooperation with the feeding action of the brushes, the eviscerated fish is pressed together so that the belly cavity of the fish is more or less closed to insure cutting of a minimum of the belly portion of the fish and a maximum cutting of the available and desirable meat of the fish.

From the foregoing, I believe it will be apparent that I have provided a novel and simple apparatus for the preparation of fish fillets from fresh fish and which can be readily used upon fish of various sizes, that is, to cut relatively small sardines and larger fish such as mackerel and the like, merely by adjusting the size of the two pairs of circular knives, and the setting of the feeding means.

I claim:

1. In a fish fillet machine; a first pair of circular knives each having an inside and an outside face, means supporting a first pair of knives in a parallel spaced relation for rotation in one direction about a common axis, the knives of said first pair being of substantially the same diameter and closely adjacent to one another; a second pair of knives; means supporting said second pair of knives in a parallel spaced relation for rotation about a common axis, the knives of said second pair being of substantially the same diameter and being parallel to said first pair of knives, each knife in said second pair overlapping in a face-to-face abutment only the inside face on one of said first pair of knives; means associated with said last-mentioned support means for rotating said second pair of knives simultaneously with the first pair of knives but in a direction opposite to said one direction; and means operatively associated with said pairs of knives for feeding a fish into said two pairs of knives during rotation thereof for cutting by the overlapping portion of said knives.

2. In a fish fillet machine; a first pair of circular knives each having an inside and an outside face, means supporting said first pair of knives in a parallel spaced relation for rotation in one direction about a common axis; the knives of said first pair being of substantially the same diameter and closely adjacent to one another; a second pair of knives; means supporting said second pair of knives in a parallel spaced relation for rotation about a common axis, the knives of said second pair being of substantially the same diameter and parallel to said first pair of knives, each knife in said second pair overlapping in a face-to-face abutment only the inside face on one of said first pair of knives; means associated with said last-mentioned support means for rotating said second pair of knives simultaneously with the first pair of knives but in a direction opposite to said one direction; and means operatively associated with said pairs of knives for feeding a fish into said knives during rotation thereof for cutting by the overlapping portion of said knives, said feeding means including a pair of brushes rotatable in the plane (a) substantially normal to a plane passing through the axis of rotation of each of said pair of knives, and (b) substantially coincident with a plane passing through the overlap of the first and second pair of knives.

3. In a fish fillet machine; a first pair of circular knives, means supporting said first pair of knives in a parallel spaced relation for rotation in one direction about a common axis, the knives of said first pair being of substantially the same diameter and spaced apart a distance not substantially greater than the width of a fish spine; a second pair of knives, means supporting said second pair of knives in a parallel spaced relation for rotation about a common axis, the knives of said second pair being of substantially the same diameter and parallel to the first pair of knives, one knife in said second pair overlapping in face-to-face abutment one knife of said first pair of knives and a second knife in said second pair of knives overlapping in face-to-face abutment the other knife of said first pair of knives; means associated with said last-mentioned support means for rotating said second pair of knives simultaneously with said first pair of knives but in a direction opposite to said one direction; and means operatively associated with said pairs of knives for feeding a fish into the overlapping portion of said first and said second pairs of knives during rotation thereof with the spine of said fish parallel to the plane of said knives.

4. In a fish fillet machine; a first pair of circular knives, means supporting said first pair of knives in a parallel spaced relation for rotation in one direction about a common axis, the knives of said first pair being of substantially the same diameter and closely adjacent to one another; a second pair of knives, means supporting said second pair of knives in a parallel spaced relation for rotation about a common axis, the knives of said second pair being of substantially the same diameter and parallel to said first pair of knives, each knife in said second pair overlapping in a face-to-face abutment only the inside face on one of the other knives of said first pair of knives; means associated with said last-mentioned support means for rotating said second pair of knives simultaneously with said first knives but in a direction opposite to said one direction; and means operatively associated with said pairs of knives for pressing together the fish sides while imparting motion to the fish to feed said fish into the overlapping portion of said first and said second pair of knives for cutting.

5. In a fish filleting machine; a first shaft, a first pair of circular disc-like knives having substantially the same diameter and slidably mounted in a parallel spaced relation on said first shaft; a second shaft parallel to said first shaft, a second pair of circular disc-like knives having substantially the same diameter and slidably mounted in a parallel spaced relation on said second shaft; said shafts being spaced apart a distance only sufficient to provide an overlap between one knife in said second pair overlapping in face-to-face abutment one knife of said first pair of knives and a second knife in said second pair overlapping in face-to-face abutment the other knife of said first pair of knives; means associated with said shafts for rotating said shafts simultaneously and in opposite directions to rotate the overlapping knife portions in a substantially common direction; a pair of brushes positioned in advance of said knives to press together and close a belly cavity in a fish positioned between said brushes, and means operatively associated with said brushes for rotating said brushes simultaneously in a plane substantially parallel to that passing through the overlapping portion of the two pairs of knives to feed a fish into said overlapping position.

6. In a fish fillet machine; a first pair of circular disc-like knives each having an inside and outside face, means supporting said first pair of knives in a parallel spaced relation for rotation in one direction about a common axis; the knives of said first pair being of substantially the same diameter and closely adjacent to one another; a second pair of circular disc-like knives, means supporting said second pair of knives in a parallel spaced relation for rotation about a common axis; the knives of said second pair being of substantially the same diameter and parallel to said first pair of knives, each of said circular knives being spaced away from the other knife of the pair a distance sufficient to allow only a passage of a compressed fish bone structure between the knives, each knife of said second pair overlapping in a face-to-face abutment the inside face on one of the said first pair of knives; means associated with said last-mentioned support means for rotating the second pair of knives simultaneously with the first pair of knives but in a direction opposite to said one direction; and means operatively associated with said pairs of knives for feeding a fish into the overlapping portion between said first and second pair of knives, said feeding means including a pair of brushes rotatable in a plane $(a)$ substantially normal to a plane passed through the axis of rotation of each pair of knives and $(b)$ substantially coincident with a plane passing through the overlap of the first and second pair of knives, said brushes maintaining a pressure against the sides of the fish sufficient to close an eviscerated cavity therein as the fish is fed by the brushes into the overlapping portion thereof.

KURT ALFRED LEUSCHNER.

REFERENCES CITED

The following references are of record in the file of this patent:

UNITED STATES PATENTS

| Number | Name | Date |
| --- | --- | --- |
| 2,179,821 | Hunt | Nov. 14, 1939 |
| 2,381,560 | Savrda | Aug. 7, 1945 |